(12) United States Patent
Liang et al.

(10) Patent No.: US 8,837,412 B2
(45) Date of Patent: Sep. 16, 2014

(54) METHOD AND APPARATUS FOR ALLOCATING EDGE FREQUENCY BAND RESOURCE, AND BASE STATION

(75) Inventors: Zheng Liang, Shenzhen (CN); Dan Li, Chengdu (CN); Guohua Zhou, Kista (SE); Lin Hua, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 314 days.

(21) Appl. No.: 13/536,480

(22) Filed: Jun. 28, 2012

(65) Prior Publication Data

US 2012/0269155 A1 Oct. 25, 2012

Related U.S. Application Data

(63) Continuation of application No. PCT/CN2010/080525, filed on Dec. 30, 2010.

(30) Foreign Application Priority Data

Dec. 31, 2009 (CN) .......................... 2009 1 0216927

(51) Int. Cl.
*H04W 4/00* (2009.01)
*H04W 72/04* (2009.01)
*H04W 28/04* (2009.01)
*H04W 88/08* (2009.01)

(52) U.S. Cl.
CPC .......... *H04W 72/0453* (2013.01); *H04W 28/04* (2013.01); *H04W 88/08* (2013.01)
USPC .......................................... 370/329; 370/328

(58) Field of Classification Search
CPC ...... H04W 72/04; H04W 88/08; H04W 76/00
USPC .................................. 370/328, 329, 330, 331
See application file for complete search history.

(56) References Cited

U.S. PATENT DOCUMENTS 6,729,929 B1 * 5/2004 Sayers et al. .................. 455/446
2004/0203459 A1 * 10/2004 Borras-Chia et al. ....... 455/67.13

(Continued)

FOREIGN PATENT DOCUMENTS

| CN | 101064905 A | 10/2007 |
|---|---|---|
| CN | 101291515 A | 10/2008 |

(Continued)

OTHER PUBLICATIONS

Extended European Search Report in corresponding European Patent Application No. 10840596.0 (Nov. 19, 2012).

(Continued)

*Primary Examiner* — Michael J Moore, Jr.
*Assistant Examiner* — Siren Wei
(74) *Attorney, Agent, or Firm* — Leydig, Voit & Mayer, Ltd.

(57) ABSTRACT

Embodiments of the present invention disclose a method and an apparatus for allocating an edge frequency band resource, and a base station. The method may include obtaining, through message interaction, usage information about an edge frequency band resource block of an adjacent mode; according to the usage information about the edge frequency band resource block of the adjacent mode and a characteristic resource block, determining an available edge frequency band resource block that is of the current mode and in a next adjustment period; and in the next adjustment period, allocating a determined available edge frequency band resource block of the current mode to each cell that is corresponding to the current mode.

17 Claims, 6 Drawing Sheets

(56) References Cited

U.S. PATENT DOCUMENTS

2004/0259561 A1* 12/2004 Stewart et al. ............. 455/452.2
2006/0019701 A1    1/2006 Ji
2007/0021151 A1* 1/2007 Mori et al. ................. 455/562.1
2009/0201867 A1* 8/2009 Teo et al. ....................... 370/329

FOREIGN PATENT DOCUMENTS

| | | |
|---|---|---|
| CN | 101730110 A | 6/2010 |
| EP | 1784031 A1 | 5/2007 |
| EP | 2326115 A1 | 5/2011 |
| WO | WO 2007/108769 A1 | 9/2007 |
| WO | WO 2009098615 A1 | 8/2009 |

OTHER PUBLICATIONS

Fan et al., "An Inter-Cell Interference Coordination Technique Based on Users' Ratio and Multi-Level Frequency Allocations," 2007, IEEE, Washington, DC.

Zhang et al., "A Novel Uplink Interference Coordination Scheme Using High Interference Indicator," 2010, IEEE, Washington, DC.

"R7-081910—Use Case of OI/HII Indicators for Uplink ICIC," 3GPP RAN1#53, May 5-9, 2008, 3GPP, Valbonne, France.

Written Opinion of the International Searching Authority in corresponding International Patent Application No. PCT/CN2010/080525 (Apr. 7, 2011).

"TR 25.814—$3^{rd}$ Generation Partnership Project; Technical Specification Group Radio Access network; Physical Layer Aspects for Evolved UTRA (Release 7)," 3GPP Technical Report, Feb. 2006, V1.1.1, 3GPP, Valbonne, France.

"R1-051051—Standard Aspects of Interference Coordination for EUTRA," 3GPP TSG RAN WG1 #42bis, Oct. 10-14, 2005, 3GPP, Valbonne, France.

"R1-060229—Some Clarifications on Soft Frequency Reuse Scheme," 3GPP TSG-RAN WG1 Meeting Ad Hoc LTE, Jan. 23-25, 2006, 3GPP, Valbonne, France.

International Search Report in corresponding International Patent Application No. PCT/CN2010/080525 (Apr. 7, 2011).

* cited by examiner

METHOD AND APPARATUS FOR ALLOCATING EDGE FREQUENCY BAND RESOURCE, AND BASE STATION

CROSS-REFERENCE TO RELATED APPLICATIONS

This application is a continuation of International Application No. PCT/CN2010/080525, filed on Dec. 30, 2010, which claims priority to Chinese Patent Application No. 200910216927.8, filed on Dec. 31, 2009, both of which are hereby incorporated by reference in their entireties.

FIELD OF THE INVENTION

The present invention relates to the field of radio communications technologies, and in particular, to a method and an apparatus for allocating an edge frequency band resource, and a base station.

BACKGROUND OF THE INVENTION

The LTE (Long Term Evolution, long term evolution technology) in the 3GPP (3rd Generation Partnership Project, 3rd generation partnership project) adopts OFDM (Orthogonal Frequency Division Multiplexing, orthogonal frequency division multiplexing) as its core transmission technology. In the case of intra-frequency networking, limited frequency band resources are reused in different cells. Therefore, it is inevitable that interference exists between adjacent cells, which need to be managed and coordinated.

At present, ICIC (Intercell interference coordination, intercell interference coordination) usually adopts a scheme of coordination between two adjacent cells. During coordination between two adjacent cells, an edge resource of a third party is usually borrowed in a circulation adjacency manner. Specifically, when a cell A and an adjacent cell B coordinate with each other, the cell A usually borrows an edge resource of another adjacent cell (for example, a cell C or a cell D) in a circulation adjacency manner, so as to avoid interference between the cell A and the cell B.

In an existing technology of coordination between two cells, interference coordination between two adjacent cells is considered but interference with another cell is not fully considered, which causes potential interference with an edge user of another adjacent cell. Therefore, an effect of the inter-cell interference coordination is poor.

SUMMARY OF THE INVENTION

Embodiments of the present invention provide a method and an apparatus for allocating an edge frequency band resource, and a base station, so as to solve a problem that according to a coordination technology between two cells in the prior art, an effect of intercell interference coordination is poor due to potential interference with an edge user of another adjacent cell. Specifically, the embodiments of the present invention may be implemented through the following technical solutions.

In one aspect, a method for allocating an edge frequency band resource is provided, which includes:

obtaining, through message interaction, usage information about an edge frequency band resource block of an adjacent mode;

according to the usage information about the edge frequency band resource block of the adjacent mode and a characteristic resource block, determining an available edge frequency band resource block that is of a current mode and in a next adjustment period, where the characteristic resource block can only be used in its corresponding mode and the adjacent mode is a mode whose characteristic resource block is adjacent in frequency to the characteristic resource block of the current mode; and in the next adjustment period, allocating a determined available edge frequency band resource block of the current mode to each cell that is corresponding to the current mode.

In another aspect, an apparatus for allocating an edge frequency band resource is provided, which includes:

a usage information obtaining module, configured to obtain, through message interaction, usage information about an edge frequency band resource block of an adjacent mode;

a mode coordination module, configured to, according to the usage information about the edge frequency band resource block of the adjacent mode and a characteristic resource block, determine an available edge frequency band resource block that is of a current mode and in a next adjustment period, wherein the characteristic resource block can only be used in its corresponding mode and the adjacent mode is a mode whose characteristic resource block is adjacent in frequency to the characteristic resource block of the current mode; and a resource allocating module, configured to, in the next adjustment period, allocate a determined available edge frequency band resource block of the current mode to each cell that is corresponding to the current mode.

In another aspect, a base station is further provided, which includes the foregoing apparatus for allocating an edge frequency band resource.

With the method, the apparatus, and the base station for allocating an edge frequency band resource provided in the embodiments of the present invention, a scheme of inter-mode interference coordination is adopted, that is, through message interaction, usage information about an edge frequency band resource block of an adjacent mode is obtained; for the implementation, according to the usage information about the edge frequency band resource block of the adjacent mode and a characteristic resource block, an available edge frequency band resource block that is of a current mode and in a next adjustment period is determined, where the characteristic resource block can only be used in its corresponding mode; and in the next adjustment period, a determined available edge frequency band resource block of the current mode is allocated to each cell that is corresponding to the current mode. Specifically, by using the scheme of inter-mode interference coordination, according to total usage information about edge frequency band resources of all cells that are corresponding to the modes, available edge frequency band resource blocks of the modes are determined, thereby effectively avoiding potential interference with another cell when independent negotiation for merely two cells or several cells is performed, so as to achieve a good effect of interference coordination. Furthermore, according to a usage condition of a frequency band resource of each mode, edge resources of cells are allocated reasonably, thereby effectively improving an overall throughput of a system and a throughput of users at cell edges.

DETAILED DESCRIPTION OF THE EMBODIMENTS

In order to make the objectives, technical solutions, and advantages of the present invention clearer, the technical solutions provided in the present invention are described in further detail in the following with reference to the embodiments and the accompanying drawings.

Figure 1:
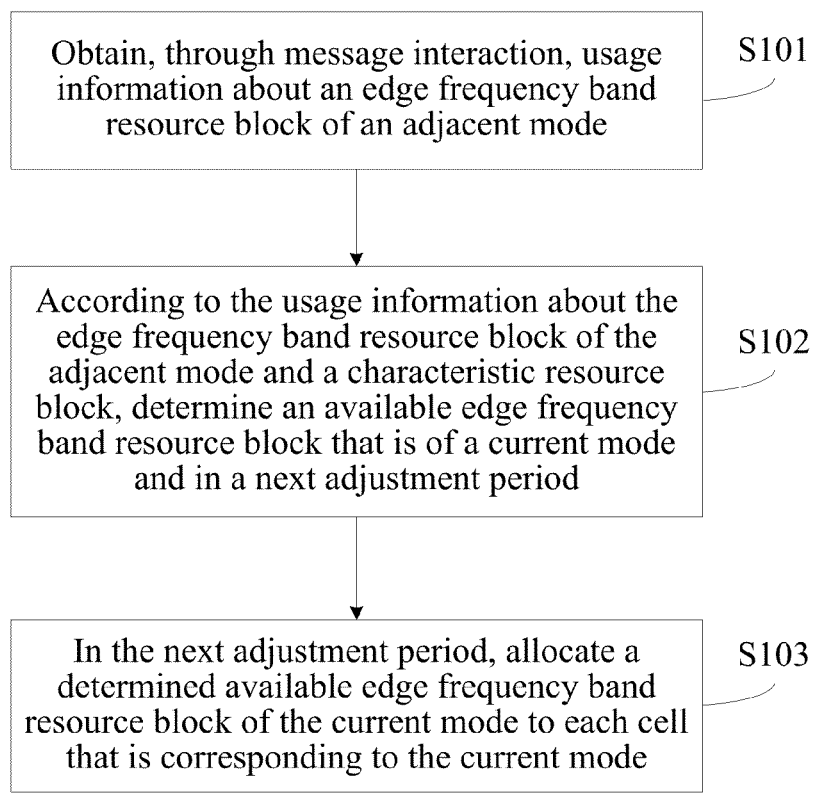
FIG. 1 is a flowchart of a method for allocating an edge frequency band resource according to an embodiment of the present invention.

An embodiment of the present invention provides a method for allocating an edge frequency band resource. Referring to FIG. 1, the method provided in this embodiment of the present invention may include:

S101: Obtain, through message interaction, usage information about an edge frequency band resource block of an adjacent mode.

The message here may be an HII message. For details about a format of the HII message, reference may be made to a corresponding description in a protocol, which is not repeated here.

In actual application, multiple implementation manners may be used for obtaining the usage information about the edge frequency band resource block of the adjacent mode through the message interaction, and one of the implementation manners may be:

First, a message sent by a cell is received, where the cell is corresponding to an adjacent mode. The message is used to indicate usage information about an edge frequency band resource block of the cell that is corresponding to the adjacent mode.

It should be noted that, generally, multiple cells may be corresponding to one mode, where the receiving the message sent by the cell that is corresponding to the adjacent mode may be: respectively obtaining, through multiple HII messages, usage information about edge frequency band resource blocks of multiple cells that are corresponding to an adjacent mode of a current mode. A received HII message of each cell is used to indicate usage information about an edge frequency band resource block of the cell.

Then, usage information about edge frequency band resource blocks of cells that are corresponding to the adjacent mode is combined to obtain usage information about an edge frequency band resource block of the adjacent mode.

In addition, it should also be noted that adjacent modes mentioned here may be modes in which characteristic resource blocks are adjacent in frequency. A characteristic resource block refers to a resource block that can only be used in its corresponding mode, that is, each mode is usually designated with a dedicated resource block in advance, where the dedicated resource block can only be used in its corresponding mode, and cannot be used in other modes. For example, it is assumed that there are 30 resource blocks in a full frequency range in total, which are numbered in ascending or descending order of frequencies as resource blocks 1, 2, 3, ..., 30, and it is usually considered that the resource block 30 and the resource block 1 form a consecutive cycle. In this example, adjacent modes may be modes in which characteristic resource blocks are adjacent in frequency. It is assumed that a characteristic resource block 28 is adjacent to a characteristic resource block 2, and is not adjacent to a characteristic resource block 6, a corresponding mode 6 and mode are adjacent modes and the mode 6 and a mode 2 are not adjacent modes. Similarly, the mode and the mode 2 are also adjacent modes.

S102: According to the usage information about the edge frequency band resource block of the adjacent mode and a characteristic resource block, determine an available edge frequency band resource block that is of the current mode and in a next adjustment period, where the characteristic resource block can only be used in its corresponding mode.

The step of determining the available edge frequency band resource block of the current mode in the next adjustment period according to the usage information about the edge frequency band resource block of the adjacent mode and the characteristic resource block may be called inter-mode interference coordination.

The foregoing example is still used to describe this step: The resource block 2 is preset as a characteristic resource block of the mode 1, the resource block 6 is preset as a characteristic resource block of the mode 2, ..., and the resource block 28 is preset as a characteristic resource block of the mode 6. Here, the resource block 2 can only be used in the mode but cannot be used in another mode, and the resource block 6 can only be used in the mode 2 but cannot be used in another mode. For example, the mode and the mode 2 may share resource blocks between their characteristic resource blocks, that is, the mode 1 and the mode 2 may share the resource blocks 3, 4, and 5; and the mode and a mode 6 may share the resource blocks 29, 30, and 1.

It should be noted that, as an implementation solution in this embodiment of the present invention, mutually orthogonal frequencies are used among modes. In this case, among edge frequency band resource blocks that may be shared by adjacent modes, if a certain edge frequency band resource block is determined as an available edge frequency band resource block of a certain mode, this resource block cannot be used as an available edge frequency band resource block of another mode. That is, among the resource blocks 3, 4, and 5 that may be shared by the mode and the mode 2, if the resource block 4 is determined as an available edge frequency band resource block of the mode 1, the resource block 4 cannot be used as an available edge frequency band resource block of the mode 2.

In this example, one implementation manner for determining the available edge frequency band resource block that is of the current and in the next adjustment period according to the usage information about the edge frequency band resource block of the adjacent mode and the characteristic resource block may be: according to usage information about edge frequency band resource blocks of adjacent modes (that is, the mode 2 and the mode 6), the mode may determine which edge frequency band resource blocks are available of the mode in a next adjustment period. For example, in a previous adjustment period, if all available edge frequency band resource blocks of the mode 2 are used while only a part of available edge frequency band resource blocks of the mode are used, the number of the available edge frequency band resource blocks of the mode may be decreased and the number of the available edge frequency band resource blocks of the mode 2 may be increased through coordination between the mode and the mode 2. The number of available edge frequency band resource blocks of each mode may be increased or decreased among characteristic resource blocks that are corresponding to each mode and sharable resource blocks of each mode. For example, for the mode 1, an available edge frequency band resource block may be determined among the resource blocks 29, 30, 1, 2, 3, 4, and 5.

In actual application, the determining method is not limited to the foregoing. Inter-mode coordination may be performed in multiple manners according to the usage information about the edge frequency band resource block of the adjacent mode, for example, inter-mode coordination may also be performed by comparing a usage rate of edge resource blocks or the number of used edge frequency band resource blocks among adjacent modes, and so on, which is not limited here.

Furthermore, it should also be noted that the characteristic resource block may be designated in advance, and may also be adjusted at any time according to current usage information about edge frequency band resource blocks of the current mode and the adjacent mode.

S103: In the next adjustment period, allocate a determined available edge frequency band resource block of the current mode to each cell that is corresponding to the current mode.

In this embodiment of the present invention, in each preset adjustment period, inter-mode coordination is performed once to re-determine an available edge frequency band resource block of each mode in a next adjustment period. Generally, one mode is corresponding to multiple cells, and the multiple cells can reuse an available edge frequency band resource block of the current mode in a current period.

It can be seen that, in this embodiment of the present invention, by using a scheme of inter-mode interference coordination, according to total usage information about edge frequency band resources of all cells that are corresponding to modes, available edge frequency band resource blocks of the modes are determined, thereby effectively avoiding potential interference with another cell when independent negotiation for merely two cells or several cells is performed, so as to achieve a good effect of interference coordination. Furthermore, according to a usage condition of a frequency band resource of each mode, edge resources of cells are allocated reasonably, thereby effectively improving an overall throughput of a system and a throughput of users at cell edges.

Furthermore, it should be noted that generally, a characteristic resource block of each mode is designated in advance, and available edge frequency band resource blocks including a corresponding characteristic resource block are initially allocated for each mode, so that an available edge frequency band resource block of each mode in each period is adjusted through negotiation between adjacent modes in subsequent each adjustment period, according to usage information about edge frequency band resource blocks of a current mode and of an adjacent mode.

The initial allocation may also be implemented in multiple manners. For example, only a characteristic resource block initially allocated to each mode is used as an initially available edge frequency band resource block, and subsequently, an available edge frequency band resource block of each mode is re-determined through coordination among adjacent modes, or according to a principle of uniform distribution, the same number of initially available edge frequency band resource blocks may be initially allocated to each mode, and subsequently, an available edge frequency band resource block of each mode is re-determined through coordination among adjacent modes, and so on.

Figure 4:
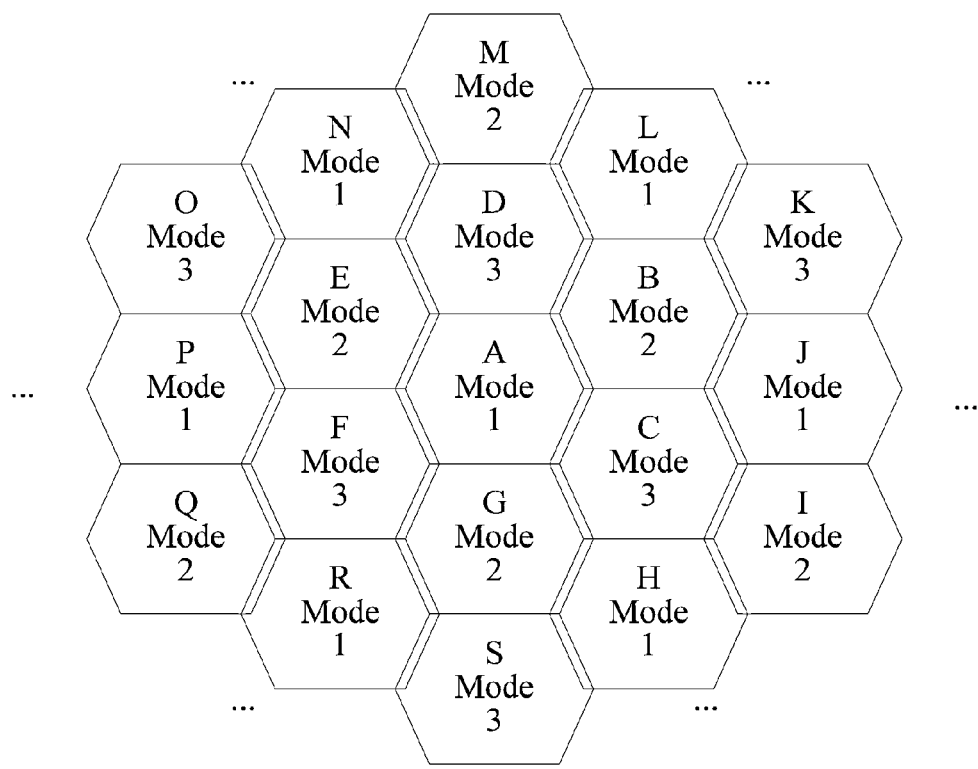
FIG. 4 is a schematic diagram of a corresponding relationship between a cell and a mode according to an embodiment of the present invention.

As another embodiment of the present invention, a corresponding relationship between a mode and a cell may be established in a manner that adjacent cells are corresponding to different modes. Specifically, a corresponding relationship between a mode and a cell may be established in a manner in an embodiment as shown in FIG. 4. In this solution, by using inter-mode interference coordination, according to total usage information about edge frequency band resources of all adjacent cells that are corresponding to modes, available edge frequency band resource blocks of the modes are determined, thereby effectively avoiding potential interference with another adjacent cell when independent negotiation for merely two adjacent cells or several adjacent cells is performed, so as to achieve a good effect of interference coordination. Furthermore, according to a usage condition of a frequency band resource of each mode, edge resources of cells are allocated reasonably, thereby effectively improving an overall throughput of a system and a throughput of users at cell edges.

Figure 2:
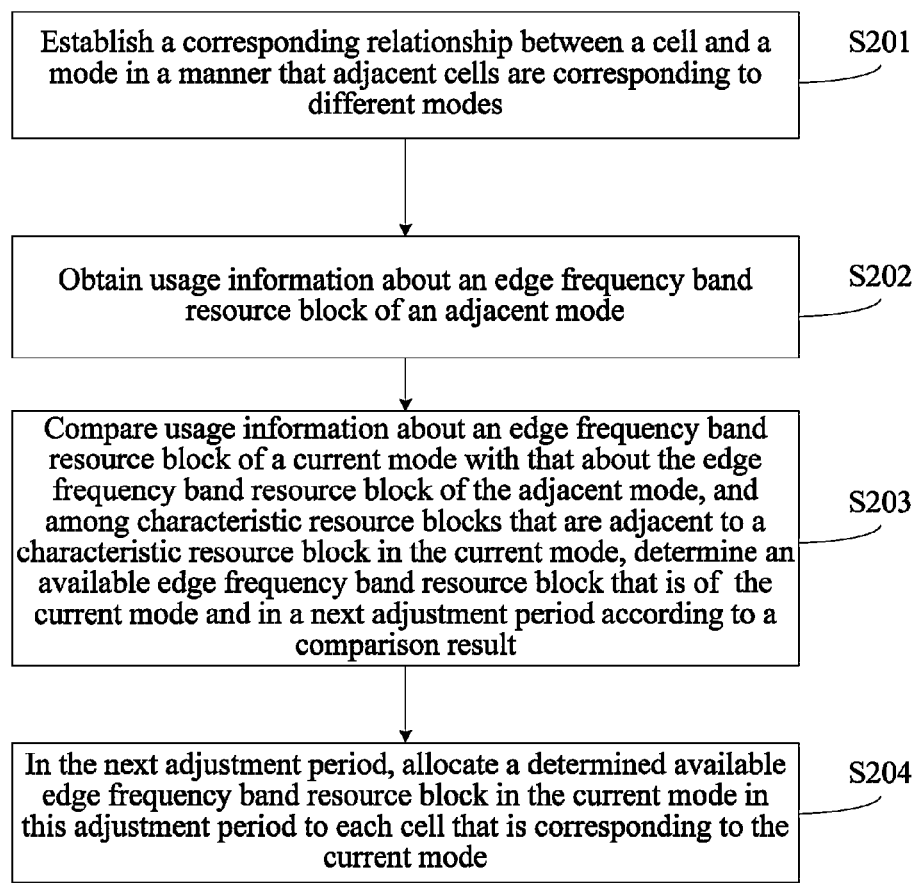
FIG. 2 is a flowchart of another method for allocating an edge frequency band resource according to an embodiment of the present invention.

An embodiment of the present invention provides another method for allocating an edge frequency band resource. It is assumed that there are three modes, namely, a mode 1, a mode 2, and a mode 3 respectively. Referring to FIG. 2, the method provided in this embodiment of the present invention may include:

In this embodiment of the present invention, resource blocks are numbered in ascending or descending order of frequencies, and characteristic resource blocks are distributed at an even interval in an ascending or a descending direction of frequencies in a full frequency range.

Figure 3:
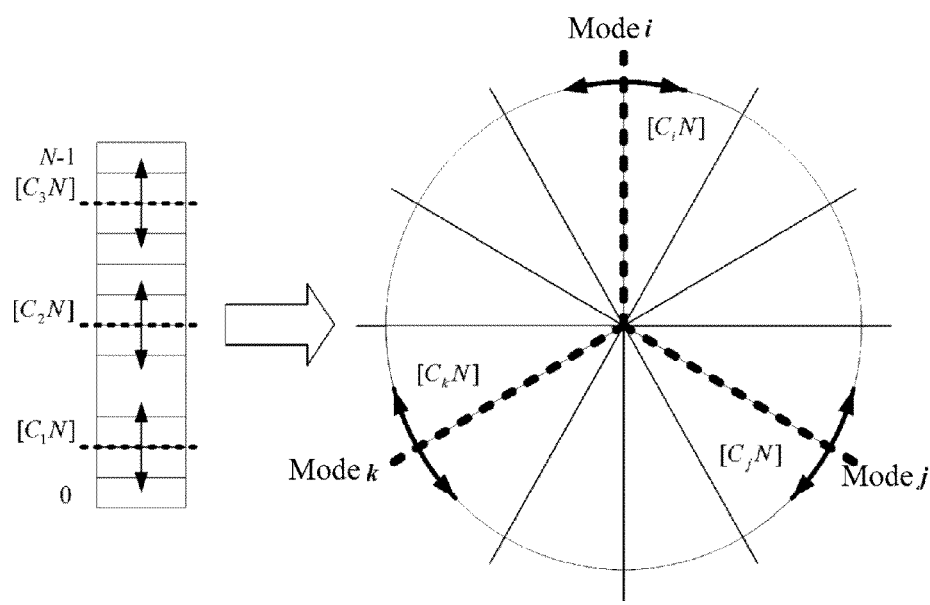
FIG. 3 is a schematic diagram of distribution of edge frequency band resources of an cell according to an embodiment of the present invention.

For example, referring to FIG. 3, available edge frequency band resources provided for each mode in a full frequency range are divided into 12 resource blocks RB (Resource Block). After sorted according to a rule of a consecutive cycle of frequencies, the resource blocks are numbered one by one in an ascending direction of frequencies and marked as 0, 1, 2, 3, ..., 11. It is considered that an RB11 and an RB0 form a consecutive cycle.

Among the foregoing numbered 12 RBs, resource blocks, the number of which is equal to that of modes, are selected according to an even interval, that is, three RBs are selected evenly. Referring to FIG. 3, an RB numbered as $[C_iN]$ is designated as a characteristic RB of a mode i (i=1, 2, 3), where N is the number (12) of the resource blocks, $C_1=\frac{1}{6}$, $C_2=\frac{1}{2}$, $C_3=\frac{5}{6}$, that is, an RB2, an RB6, and an RB10 are selected, the RB2 may be designated as a dedicated characteristic RB of the mode, the RB6 may be designated as a dedicated characteristic RB of the mode 2, and the RB10 may be designated as a dedicated characteristic RB of the mode 3.

The RB numbered as $[C_iN]$ cannot be used in a mode j (!=i), that is, in one mode, a characteristic RB of another mode cannot be used. Therefore, the mode i can be identified through a characteristic resource block, that is, the RB numbered as $[C_iN]$.

S201: Establish a corresponding relationship between a cell and a mode in a manner that adjacent cells are corresponding to different modes.

Since mutually orthogonal frequencies are used among modes, in this embodiment of the present invention, a corresponding relationship between a cell and a mode may be established according to a rule that makes adjacent cells be corresponding to different modes to the greatest extent. For example, FIG. 4 is a possible expression manner of a corresponding relationship between a mode and a cell.

Usually, a corresponding relationship between a cell and a mode may be established in advance. In this way, the established corresponding relationship between a cell and a mode may be used directly in application, so that each time when allocation of edge frequency band resources is implemented, a corresponding relationship between a cell and a mode does not need to be reset. Definitely, a corresponding relationship between a cell and a mode may be changed according to a specific application scenario and a condition of inter-mode coordination.

S202: Obtain usage information about an edge frequency band resource block of an adjacent mode.

Through information interaction, in one mode (for example, a mode ), usage information about an edge frequency band resource block of an adjacent mode may be obtained. Specifically, the usage information may be obtained in the following manner (the mode is used as an example for description, and a principle of another mode for obtaining usage information is the same).

Sub-step a: According to the corresponding relationship between a cell and a mode, in the mode 1, for example, an HII message may be received through an X2 interface, where the HII message is sent by a cell that is corresponding to an adjacent mode. The message is used to indicate usage information about an edge frequency band resource block of the cell that is corresponding to the adjacent mode. In this way, usage information about an edge frequency band resource block of a cell that is corresponding to each adjacent mode is obtained.

Sub-step b: In the mode 1, usage information about edge frequency band resource blocks of cells that are corresponding to adjacent modes are combined to obtain usage information about edge frequency band resource blocks of the adjacent modes.

The usage information about an edge frequency band resource block here may be information about a used or an unused edge frequency band resource block, and may also be a usage rate of an edge frequency band resource block, and so on.

After HII messages of cells that are corresponding to all adjacent modes are received in the mode 1, a union of usage information that is indicated by the HII messages in the same mode and is about the edge frequency band resource blocks of the adjacent cells is obtained, so as to obtain edge frequency band information in a mode level (Mode Level).

It should be noted that the usage information about the edge frequency band resource block of the adjacent mode may be obtained periodically according to a preset adjustment period.

S203: Compare usage information about an edge frequency band resource block of a current mode with that about the edge frequency band resource block of the adjacent mode, and among characteristic resource blocks that are adjacent to a characteristic resource block of the current mode, determine an available edge frequency band resource block that is of the current mode and in a next adjustment period according to a comparison result.

Here, this step may be implemented by using the following two sub-steps.

Sub-step 1: The determining the available edge frequency band resource block that is of the current mode and in the next adjustment period according to the comparison result is: expanding an available edge frequency band resource block of the current mode from a characteristic resource block of the current mode to an adjacent characteristic resource block, or shrinking to a characteristic resource block of the current mode, or maintaining unchanged.

If the comparison result is that a usage condition of the edge frequency band resource block of the current mode is greater than a usage condition of the edge frequency band resource block of the adjacent mode, the determining the available edge frequency band resource block that is of the current mode and in the next adjustment period is: expanding an available edge frequency band resource block of the current mode from a characteristic resource block of the current mode to an adjacent characteristic resource block.

If the comparison result is that the usage condition of the edge frequency band resource block of the current mode is smaller than the usage condition of the edge frequency band resource block of the adjacent mode, the determining the available edge frequency band resource block that is of the current mode and in the next adjustment period is: shrinking an available edge frequency band resource block in the current mode to a characteristic resource block in the current mode.

If the comparison result is that the usage condition of the edge frequency band resource block of the current mode is equal to the usage condition of the edge frequency band resource block of the adjacent mode, the determining the available edge frequency band resource block that is of the current mode and in the next adjustment period is: maintaining an available edge frequency band resource block of the current mode unchanged.

There are multiple comparison and determination methods. For details, reference may be made to the description in the foregoing method embodiment. The description is made here by taking a comparison of usage rates of adjacent modes as an example. If a usage rate of an edge frequency band resource block of the mode is high and a usage rate of an edge frequency band resource block of the mode 2 is low, it may be coordinated that, in the next adjustment period, more edge frequency band resource blocks among an RB2, an RB3, an RB 4, and an RB5 are used in the mode 1, and less edge frequency band resource blocks among the RB3, the RB4, the RB5, and an RB6 are used in the mode 2 . Similarly, if a usage rate of an edge frequency band resource block of the mode is low and a usage rate of an edge frequency band resource block of the mode 3 is high, it may be coordinated that, in the next adjustment period, less edge frequency band resource blocks among an RB11, an RB0, an RB1, and an RB2 are used in the mode 1, and more edge frequency band resource blocks among an RB12, the RB11, the RB0, and the RB1 are used in the mode 3.

Sub-step 2: In a manner of symmetrical distribution at both sides of a characteristic resource block of the current mode, determine the number of resource blocks to be expanded or shrunk, that is, compare an absolute value of a difference between the number of used resource blocks at a positive side and the number of used resource blocks at a negative side of a characteristic resource block of the current mode, and determine, according to a rule that makes the absolute value of the difference decrease, the number of resource blocks to be expanded or shrunk.

The positive side of the characteristic resource block is a resource block located between the characteristic resource block and an adjacent characteristic resource block in an ascending direction of frequencies, and the negative side of the characteristic resource block is a resource block located between the characteristic resource block and an adjacent characteristic resource block in a descending direction of frequencies.

The description is made here by taking a comparison of an absolute value of a difference between the number of used resource blocks at a positive side and the number of used resource blocks at a negative side of a characteristic resource block of a mode as an example.

A positive side of a characteristic resource block of a certain mode is a resource block located between the characteristic resource block and an adjacent characteristic resource block in an ascending direction of frequencies, and the negative side is a resource block located between the characteristic resource block and an adjacent characteristic resource block in a descending direction of frequencies.

Specifically, for a nonnegative integer k∈[0, N−1], an RB numbered as $([C_iN]+k) \bmod N$ is called an "RB at a positive side of an edge user in a mode i".

For a positive integer k∈[1, N−1], an RB numbered as $([C_iN]−k) \bmod N$ is called an "RB at a negative side of the edge user in the mode i".

The description is made with reference to an example. For the mode, it is assumed that its characteristic resource block is an RB2, and two characteristic resource blocks adjacent to the characteristic resource block RB2 are an RB6 and an RB10 respectively. At this time, RBs at a negative side of the characteristic resource block RB2 may include an RB1, an RB0, and an RB11, and RBs at a positive side of the characteristic resource block RB2 may include an RB3, an RB4, and an RB5.

Specifically, between two characteristic RBs, that is, the RB10 and the RB6, adjacent to the RB2 (including the RB11, the RB, the RB1, the RB3, the RB4, and the RB5), according to obtained usage information about edge frequency band resource blocks of an adjacent mode, used resource blocks among the RB11, the RB0, and the RB1 are compared with used resource blocks among the RB3, the RB4, and the RB5 to obtain an absolute value of a difference between the number of the used resource blocks at the positive side and the number of the used resource blocks at the negative side. If it is assumed that the used resource blocks are the RB1, the RB0, and the RB11, the absolute value of the difference between the number of the used resource blocks at the positive side and the number of the used resource blocks at the negative side is 1.

According to the foregoing manner that makes the absolute value of the difference decrease, it is determined which specific edge frequency band resource blocks are available at a positive side or a negative side of a characteristic resource block of the current mode.

Here, "as symmetrical as possible" indicates that: For the mode i, an absolute value of a difference between the number of RBs that are at a positive side and available to an edge user and the number of RBs that are at a negative side and available to the edge user is as small as possible.

Figure 5:
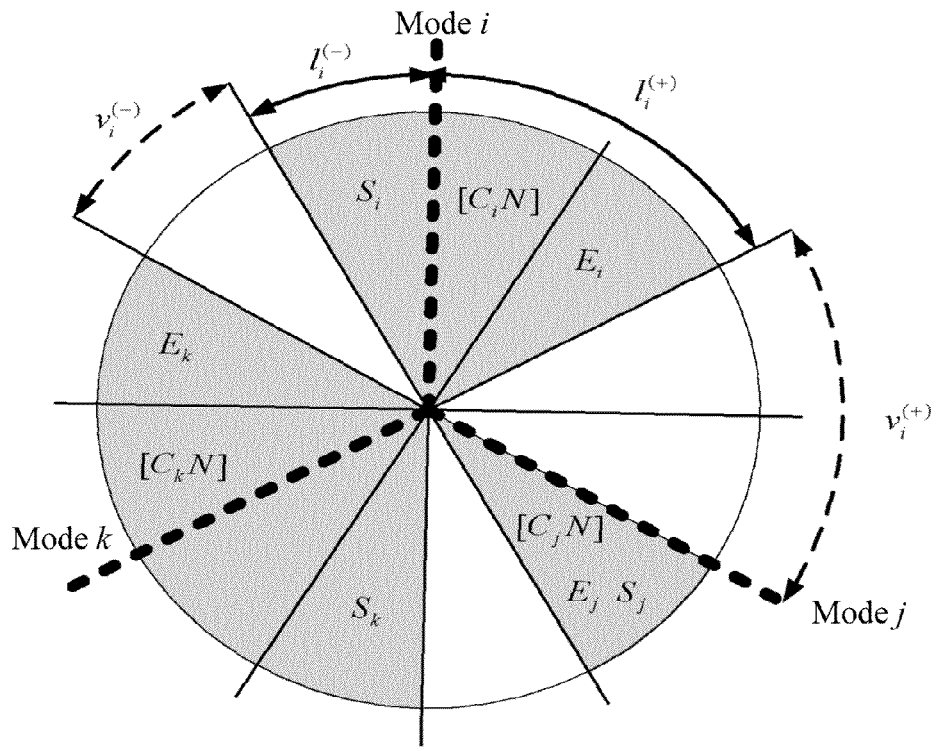
FIG. 5 is a schematic diagram of adjustment of edge frequency band resources according to an embodiment of the present invention.

Referring to FIG. 5, $l_i^{(+)}$ represents the number of RBs that are at a positive side of an edge frequency band of this cell, $l_i^{(-)}$ represents the number of RBs that are at a negative side of the edge frequency band of this cell, $v_i^{(+)}$ represents the maximum increasable number of RBs at the positive side of the edge frequency band of this cell, and $v_i^{(-)}$ represents the maximum increasable number of RBs at the negative side of the edge frequency band of this cell. It is assumed that adjustment amounts at the positive side and the negative side of the edge frequency band are $\Delta_i(+)$ and $\Delta_i(-)$ respectively, and the foregoing parameters satisfy the following constraint conditions: $-l_i^{(+)} \le \Delta_i^{(+)} \le v_i^{(+)}$ and $-l_i^{(-)} \le \Delta_i^{(-)} \le v_i^{(-)}$. After adjustment, $|l_i^{(+)}+\Delta_i^{(+)}-l_i^{(-)}-\Delta_i^{(-)}|$ has a minimum value.

Through this step, it is determined, according to the comparison result, that a specific resource block needs to be expanded or shrunk at the positive side or the negative side, and then in a manner that makes distribution at both sides of a characteristic resource block of the current mode be symmetrical as much as possible, the number of resource blocks that need to be expanded or shrunk at the positive side and the negative side is determined, so as to determine which edge frequency band resource blocks are available in the current mode.

If available edge frequency band resource blocks of a current mode are an RB2 and an RB3, through compassion with the mode 2, the mode needs to be adjusted, so that one more edge frequency band resource block is used in the mode in a next adjustment period, and it is determined that in the next adjustment period, available edge frequency band resource blocks of the mode are the RB2, the RB3, and an RB4. If the mode needs to be adjusted, so that one less edge frequency band resource block is used in the mode in the next adjustment period, it is determined that in the next adjustment period, an available edge frequency band resource block of the mode is the RB2.

S204: In the next adjustment period, allocate a determined available edge frequency band resource block of the current mode in this adjustment period to each cell that is corresponding to the current mode.

It can be seen that, in this embodiment of the present invention, by using a scheme of inter-mode interference coordination, according to total usage information about edge frequency band resources of all cells that are corresponding to modes, available edge frequency band resource blocks of the modes are determined, thereby effectively avoiding potential interference with another cell when independent negotiation for merely two cells or several cells is performed, so as to achieve a good effect of interference coordination. Furthermore, according to a usage condition of a frequency band resource of each mode, edge resources of cells are allocated reasonably, thereby effectively improving an overall throughput of a system and a throughput of users at cell edges.

Furthermore, in this embodiment of the present invention, since a manner of expansion or shrinking from a characteristic resource block to two sides is used, and inter-mode coordination is performed according to a rule that makes distribution of edge frequency band resources at positive and negative sides of a characteristic resource block of the current mode be symmetrical as much as possible, balance and fairness of a service may further be improved.

In addition, in this embodiment of the present invention, characteristic resource blocks of each mode are distributed at an even interval. Therefore, desirable fairness can also be achieved.

Figure 6:
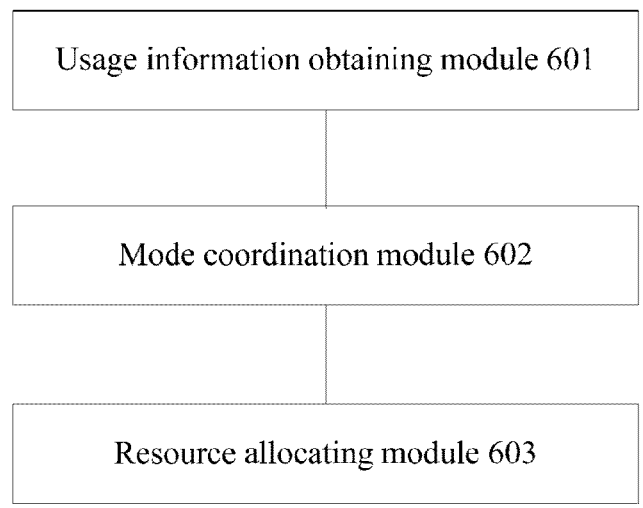
FIG. 6 is a structural block diagram of an apparatus for allocating an edge frequency band resource according to an embodiment of the present invention.

Referring to FIG. 6, an embodiment of the present invention provides an apparatus for allocating an edge frequency band resource, where the apparatus includes:

A usage information obtaining module 601 is configured to obtain, through message interaction, usage information about an edge frequency band resource block of an adjacent mode.

The message here may be an HII message. For details about a format of the HII message, reference may be made to a corresponding description in a protocol, which is not repeated here.

A mode coordination module 602 is configured to, according to the usage information about the edge frequency band resource block of the adjacent mode and a characteristic resource block, determine an available edge frequency band resource block that is of a current mode and in a next adjustment period, where the characteristic resource block can only be used in its corresponding mode.

A step of determining the available edge frequency band resource block that is of the current mode and in the next adjustment period according to the usage information about the edge frequency band resource block of the adjacent mode and the characteristic resource block may be called inter-mode interference coordination.

A resource allocating module 603 is configured to, in the next adjustment period, allocate a determined available edge frequency band resource block of the current mode to each cell that is corresponding to the current mode.

In this embodiment of the present invention, in each preset adjustment period, inter-mode coordination is performed once to re-determine an available edge frequency band resource block that is of each mode and in the next adjustment period. In each adjustment period, each cell is allocated with a determined available edge frequency band resource block in a current period in its corresponding mode for use. Generally, one mode is corresponding to multiple cells, and the multiple cells can reuse an available edge frequency band resource block of the current mode in the current period.

It should be noted that, for a related technical feature in this apparatus embodiment, reference may be made to a technical feature in the foregoing method embodiment, which is not repeated here.

It can be seen that, in this embodiment of the present invention, by using a scheme of inter-mode interference coordination, according to total usage information about edge frequency band resources of all cells that are corresponding to modes, available edge frequency band resource blocks of the modes are determined, thereby effectively avoiding potential interference with another cell when independent negotiation for merely two cells or several cells is performed, so as to achieve a good effect of interference coordination. Furthermore, according to a usage condition of a frequency band resource of each mode, edge resources of cells are allocated reasonably, thereby effectively improving an overall throughput of a system and a throughput of users at cell edges.

Figure 7:
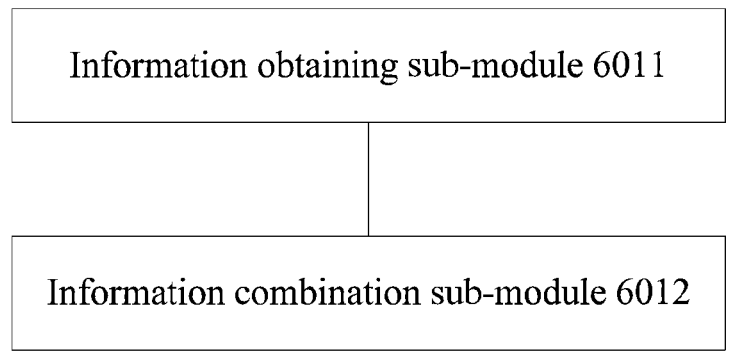
FIG. 7 is a structural block diagram of a usage information obtaining module according to an embodiment of the present invention.

Referring to FIG. 7, in an embodiment of the present invention, a usage information obtaining module 601 may include:

an information obtaining sub-module 6011, configured to receive a message sent by a cell, where the cell is corresponding to an adjacent mode, and the message is used to indicate usage information about an edge frequency band resource block of the cell that is corresponding to the adjacent mode; and an information combination sub-module 6012, configured to combine usage information about the edge frequency band resource blocks of cells that are corresponding to the adjacent mode to obtain usage information about edge frequency band resource blocks of the adjacent mode.

Figure 8:
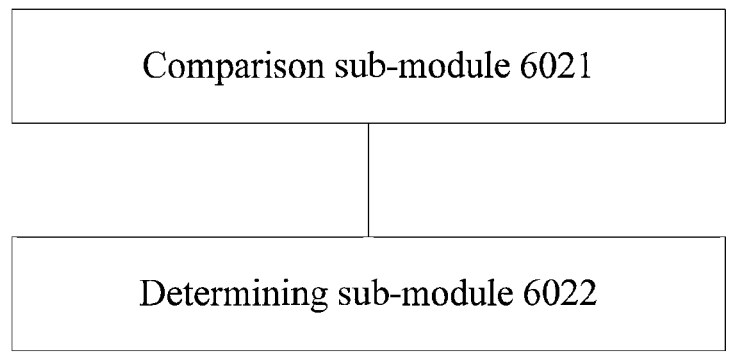
FIG. 8 is a structural block diagram of a mode coordination module according to an embodiment of the present invention.

In another embodiment of the present invention, referring to FIG. 8, a mode coordination module 602 may include:

a comparison sub-module 6021, configured to compare usage information about an edge frequency band resource block of the current mode with that about an edge frequency band resource block of an adjacent mode; and a determining sub-module 6022, configured to, among characteristic resource blocks that are adjacent to a characteristic resource block of the current mode, determine an available edge frequency band resource block that is of the current mode and in a next adjustment period according to a comparison result.

In another embodiment of the present invention, a determining sub-module 6022 may include:

an adjustment direction determining unit, configured to determine, according to a comparison result, an available edge frequency band resource block that is of a current mode and in a next adjustment period in a manner of: expanding an available edge frequency band resource block of the current mode from a characteristic resource block of the current mode to an adjacent characteristic resource block, or shrinking to a characteristic resource block of the current mode, or maintaining unchanged; and an adjustment number determining unit, configured to, in a manner of symmetrical distribution at both sides of a characteristic resource block of the current mode, determine the number of resource blocks to be expanded or shrunk.

The foregoing adjustment direction determining unit may include:

a first determining sub-unit, configured to, if the comparison result is that a usage condition of the edge frequency band resource block of the current mode is greater than a usage condition of the edge frequency band resource block of the adjacent mode, determine the available edge frequency band resource block that is of the current mode and in the next adjustment period in a manner of: expanding the available edge frequency band resource block of the current mode from the characteristic resource block of the current mode to the adjacent characteristic resource block; or a second determining sub-unit, configured to, if the comparison result is that the usage condition of the edge frequency band resource block of the current mode is smaller than the usage condition of the edge frequency band resource block of the adjacent mode, determine the available edge frequency band resource block that is of the current mode and in the next adjustment period in a manner of: shrinking the available edge frequency band resource block of the current mode to the characteristic resource block of the current mode; or a third determining sub-unit, configured to, if the comparison result is that the usage condition of the edge frequency band resource block of the current mode is equal to the usage condition of the edge frequency band resource block of the adjacent mode, determine the available edge frequency band resource block that is of the current mode and in the next adjustment period in a manner of: maintaining the available edge frequency band resource block of the current mode unchanged.

In this embodiment of the present invention, the adjustment number determining unit is specifically configured to:

compare an absolute value of a difference between the number of used resource blocks at a positive side and the number of used resource blocks at a negative side of a characteristic resource block of the current mode, and determine, according to a rule that makes the absolute value of the difference decrease, the number of resource blocks to be expanded or shrunk, where the positive side of the characteristic resource block is a resource block located between the characteristic resource block and an adjacent characteristic resource block in an ascending direction of frequencies, and the negative side of the characteristic resource block is a resource block located between the characteristic resource block and an adjacent characteristic resource block in a descending direction of frequencies.

The apparatus in this embodiment of the present invention may further include:

a characteristic resource block adjusting module, configured to adjust a characteristic resource block of each mode according to current usage information about edge frequency band resource blocks of a current mode and of an adjacent mode.

It should be noted that, in this embodiment of the present invention, and an available edge frequency band resource block may be used in each mode by adopting mutually orthogonal frequencies.

Furthermore, it should be noted that, in this embodiment of the present invention, a corresponding manner between a cell and a mode may specifically be that adjacent cells are corresponding to different modes.

For details about a working principle and a processing procedure of each module in the apparatus embodiment, reference is made to related descriptions in the foregoing method embodiment, which are not repeated here.

Furthermore, an embodiment of the present invention provides a base station, which includes the apparatus for allocating an edge frequency band resource in the embodiment shown in FIG. 6, FIG. 7, or FIG. 8.

For a technical feature of the apparatus for allocating an edge frequency band resource included in the base station, reference is made to the technical feature in the foregoing method embodiment and in the foregoing apparatus embodiment, which is not repeated here.

With the base station provided in this embodiment of the present invention, potential interference with another cell may be effectively avoided when independent negotiation for merely two cells or several cells is performed, so as to achieve a good effect of interference coordination. Furthermore, according to a usage condition of a frequency band resource of each mode, edge resources of cells are allocated reasonably, thereby effectively improving an overall throughput of a system and a throughput of users at cell edges.

It should be noted that relational terms such as "first" and "second" are only used to differ an entity or operation from another entity or operation in this specification, and do not require or imply any real relationship or sequence among these entities or operations. Furthermore, terms "include", "contain" or any of their derivatives are intended to convey a non-exclusive connotation, so that a process, a method, an article or a device including a series of elements not only includes such elements, but also includes other elements that are not listed explicitly, or further includes inherent elements of the process, the method, the article or the device. If no more limitations are made, an element limited by "include a/an..." does not exclude another same element existing in the process, the method, the article, or the device that includes the element.

Persons of ordinary skill in the art may understand that all or a part of the steps of the method according to the foregoing embodiments may be implemented by a computer program instructing relevant hardware. The program may be stored in a computer readable storage medium. When the program is performed, several instructions are included to perform the method described in each embodiment of the present invention. The storage medium here includes a ROM/RAM, a magnetic disk, and an optical disk.

The foregoing descriptions are merely exemplary embodiments of the present invention, and are not intended to limit the protection scope of the present invention. Any modification, equivalent replacement, and improvement made without departing from the spirit and principle of the present invention all fall within the protection scope of the present invention.

What is claimed is:

1. A method for allocating an edge frequency band resource, comprising:
   obtaining, through message interaction, usage information about an edge frequency band resource block of an adjacent mode;
   according to the usage information about the edge frequency band resource block of the adjacent mode and a characteristic resource block, determining an available edge frequency band resource block of a current mode for a next adjustment period, wherein the characteristic resource block is only used in its corresponding mode and the adjacent mode is a mode whose characteristic resource block is adjacent in frequency to the characteristic resource block of the current mode; and
   in the next adjustment period, allocating the determined available edge frequency band resource block of the current mode to each cell that corresponds to the current mode;
   wherein determining the available edge frequency band resource block of the current mode for the next adjustment period comprises:
   comparing usage information about an edge frequency band resource block of the current mode with usage information about the edge frequency band resource block of the adjacent mode; and
   among characteristic resource blocks that are adjacent to a characteristic resource block of the current mode, determining the available edge frequency band resource block of the current mode for the next adjustment period based on the comparison.

2. The method according to claim 1, wherein the obtaining, through message interaction, the usage information about the edge frequency band resource block of the adjacent mode comprises:
   receiving a message sent by each cell that is corresponding to the adjacent mode, the message being used to indicate usage information about an edge frequency band resource block of a cell that is corresponding to the adjacent mode; and
   obtaining usage information about edge frequency band resource blocks of the adjacent mode by combining usage information about the edge frequency band resource block of each cell that is corresponding to the adjacent mode.

3. The method according to claim 1, wherein the determining the available edge frequency band resource block of the current mode for the next adjustment period according to the comparison result comprises:
   expanding an available edge frequency band resource block of the current mode from a characteristic resource block of the current mode to an adjacent characteristic resource block, or shrinking to a characteristic resource block of the current mode, or maintaining unchanged; and
   when it is determined to expand the available edge frequency band resource block of the current mode from the characteristic resource block of the current mode to the adjacent characteristic resource block or shrink to the characteristic resource block of the current mode, determining, in a manner of symmetrical distribution at both sides of the characteristic resource block of the current mode, the number of resource blocks to be expanded or shrunk.

4. The method according to claim 3, wherein
   if the comparison result is that a usage condition of the edge frequency band resource block of the current mode is greater than a usage condition of the edge frequency band resource block of the adjacent mode, determining the available edge frequency band resource block of the current mode for the next adjustment period includes expanding an available edge frequency band resource block of the current mode from a characteristic resource block of the current mode to an adjacent characteristic resource block; or if the comparison result is that a usage condition of the edge frequency band resource block of the current mode is smaller than a usage condition of the edge frequency band resource block of the adjacent mode, determining the available edge frequency band resource block of the current mode for the next adjustment period includes shrinking an available edge frequency band resource block of the current mode to a characteristic resource block of the current mode; or if the comparison result is that a usage condition of the edge frequency band resource block of the current mode is equal to a usage condition of the edge frequency band resource block of the adjacent mode, determining the available edge frequency band resource block of the current mode for the next adjustment period includes maintaining an available edge frequency band resource block of the current mode unchanged.

5. The method according to claim 3, wherein the determining, in the manner of symmetrical distribution at both sides of the characteristic resource block of the current mode, the number of resource blocks to be expanded or shrunk comprises:

comparing an absolute value of a difference between the number of used resource blocks at a positive side and the number of used resource blocks at a negative side of the characteristic resource block of the current mode, and determining, according to a rule that makes the absolute value decrease, the number of resource blocks to be expanded or shrunk, wherein the positive side of the characteristic resource block is a resource block located between the characteristic resource block and an adjacent characteristic resource block in an ascending direction of frequencies, and the negative side of the characteristic resource block is a resource block located between the characteristic resource block and an adjacent characteristic resource block in a descending direction of frequencies.

6. The method according to claim 2, wherein the message is an HII message.

7. An apparatus for allocating an edge frequency band resource, comprising:

a usage information obtaining module, configured to obtain, through message interaction, usage information about an edge frequency band resource block of an adjacent mode;

a mode coordination module, configured to, according to the usage information about the edge frequency band resource block of the adjacent mode and a characteristic resource block, determine an available edge frequency band resource block of a current mode for a next adjustment period, wherein the characteristic resource block is only used in its corresponding mode and the adjacent mode is a mode whose characteristic resource block is adjacent in frequency to the characteristic resource block of the current mode; and a resource allocating module, configured to, in the next adjustment period, allocate, the available edge frequency band resource block of the current mode to each cell that corresponds to the current mode, wherein the available edge frequency band resource block is determined by the mode coordination module;

wherein the mode coordination module further comprises:
a comparison sub-module, configured to compare usage information about an edge frequency band resource block of the current mode with usage information about an edge frequency band resource block of the adjacent mode; and a determining sub-module, configured to, among characteristic resource blocks that are adjacent to a characteristic resource block of the current mode, determine the available edge frequency band resource block of the current mode for the next adjustment period based on a comparison result of the comparison sub-module.

8. The apparatus according to claim 7, wherein the usage information obtaining module comprises:

an information obtaining sub-module, configured to receive a message sent by each cell that is corresponding to the adjacent mode, the message being used to indicate usage information about an edge frequency band resource block of a cell that is corresponding to the adjacent mode; and an information combination sub-module, configured to combine usage information of the edge frequency band resource block about each cell that is corresponding to the adjacent mode, to obtain usage information about edge frequency band resource blocks of the adjacent mode.

9. The apparatus according to claim 7, wherein the determining sub-module comprises:

an adjustment direction determining unit, configured to determine, the available edge frequency band resource block of the current mode for the next adjustment period according to the comparison result in a manner of: expanding an available edge frequency band resource block of the current mode from a characteristic resource block of the current mode to an adjacent characteristic resource block, or shrinking to a characteristic resource block of the current mode, or maintaining unchanged; and an adjustment number determining unit, configured to, when the adjustment direction determining unit determines that the available edge frequency band resource block of the current mode is expanded from the characteristic resource block of the current mode to the adjacent characteristic resource block or shrunk to the characteristic resource block of the current mode, determine, in a manner of symmetrical distribution at both sides of the characteristic resource block of the current mode, the number of resource blocks to be expanded or shrunk.

10. The apparatus according to claim 9, wherein the adjustment direction determining unit comprises:

a first determining sub-unit, configured to, if the comparison result is that a usage condition of the edge frequency band resource block of the current mode is greater than a usage condition of the edge frequency band resource block of the adjacent mode, determine the available edge frequency band resource block of the current mode for the next adjustment period by expanding an available edge frequency band resource block of the current mode from a characteristic resource block of the current mode to an adjacent characteristic resource block; or a second determining sub-unit, configured to, if the comparison result is that a usage condition of the edge frequency band resource block of the current mode is smaller than a usage condition of the edge frequency band resource block of the adjacent mode, determine the available edge frequency band resource block of the current mode for the next adjustment period by shrinking an available edge frequency band resource block of the current mode to a characteristic resource block of the current mode; or a third determining subunit, configured to, if the comparison result is that a usage condition of the edge frequency band resource block of the current mode is equal to a usage condition of the edge frequency band resource block of the adjacent mode, determine the available edge frequency band resource block of the current mode for the next adjustment period by maintaining an available edge frequency band resource block of the current mode unchanged.

11. The apparatus according to claim 9, wherein the adjustment number determining unit is specifically configured to:
compare an absolute value of a difference between the number of used resource blocks at a positive side and the number of used resource blocks at a negative side of the characteristic resource block of the current mode, and determine, according to a rule that makes the absolute value of the difference decrease, the number of resource blocks to be expanded or shrunk,
wherein the positive side of the characteristic resource block is a resource block located between the characteristic resource block and an adjacent characteristic resource block in an ascending direction of frequencies, and the negative side of the characteristic resource block is a resource block located between the characteristic resource block and an adjacent characteristic resource block in a descending direction of frequencies.

12. The apparatus according to claim 8, wherein the message is an HII message.

13. A base station, comprising:
an apparatus for allocating an edge frequency band resource, the apparatus being configured to:
obtain, through message interaction, usage information about an edge frequency band resource block of an adjacent mode;
according to the usage information about the edge frequency band resource block of the adjacent mode and a characteristic resource block, determine an available edge frequency band resource block of a current mode for a next adjustment period; and
allocate, in the next adjustment period, the available edge frequency band resource block of the current mode to each cell that corresponds to the current mode;
wherein the characteristic resource block is only used in its corresponding mode, the adjacent mode is a mode whose characteristic resource block is adjacent in frequency to the characteristic resource block of the current mode, and the available edge frequency band resource block is determined by the mode coordination module;
wherein the apparatus is further configured to:
compare usage information about an edge frequency band resource block of the current mode with usage information about an edge frequency band resource block of the adjacent mode; and
among characteristic resource blocks that are adjacent to a characteristic resource block of the current mode, determine the available edge frequency band resource block of the current mode for the next adjustment period based on the comparison.

14. The base station according to claim 13, wherein the apparatus is further configured to:
receive a message which indicates usage information about an edge frequency band resource block of a cell corresponding to the adjacent mode and is sent by each cell that is corresponding to the adjacent mode; and
combine usage information of the edge frequency band resource block about each cell that is corresponding to the adjacent mode, to obtain usage information about edge frequency band resource blocks of the adjacent mode.

15. The base station according to claim 13, wherein
if the comparison result is that a usage condition of the edge frequency band resource block of the current mode is greater than a usage condition of the edge frequency band resource block of the adjacent mode, the apparatus is configured to determine the available edge frequency band resource block of the current mode for the next adjustment period by expanding an available edge frequency band resource block of the current mode from a characteristic resource block of the current mode to an adjacent characteristic resource block; or if the comparison result is that a usage condition of the edge frequency band resource block of the current mode is smaller than a usage condition of the edge frequency band resource block of the adjacent mode, the apparatus is configured to determine the available edge frequency band resource block of the current mode for the next adjustment period by shrinking an available edge frequency band resource block of the current mode to a characteristic resource block of the current mode; or if the comparison result is that a usage condition of the edge frequency band resource block of the current mode is equal to a usage condition of the edge frequency band resource block of the adjacent mode, the apparatus is configured to determine the available edge frequency band resource block of the current mode for the next adjustment period by maintaining an available edge frequency band resource block of the current mode unchanged.

16. The base station according to claim 13, wherein the message is an HII message.

17. The base station according to claim 14, wherein the message is an HII message.

* * * * *